United States Patent [19]

Barlet

[11] Patent Number: 5,077,653

[45] Date of Patent: Dec. 31, 1991

[54] PROCESS AND DEVICE FOR PROGRAMMED SPREADING OF AN ACTIVE PRODUCT ON THE SURFACE OF THE GROUND

[76] Inventor: Christian Barlet, Ferme de Pennemort, 78580 Maule, France

[21] Appl. No.: 441,293

[22] Filed: Nov. 27, 1989

[30] Foreign Application Priority Data

Nov. 28, 1988 [FR] France .............................. 88 15525

[51] Int. Cl.⁵ ............................................ G06F 15/62
[52] U.S. Cl. ............................... 364/167.01; 364/479; 239/1; 239/69; 239/97
[58] Field of Search .................. 364/510, 479, 424.07, 364/167.01; 239/61, 97, 67–71, 74, 1; 222/1, 23, 52

[56] References Cited

U.S. PATENT DOCUMENTS

| | | | |
|---|---|---|---|
| 3,815,830 | 6/1974 | Rowan | 239/163 |
| 4,093,107 | 6/1978 | Allman et al. | 222/23 |
| 4,220,998 | 9/1980 | Kays | 364/510 |
| 4,530,463 | 7/1985 | Hiniker et al. | 239/71 |
| 4,637,547 | 1/1987 | Hiniker et al. | 239/155 |
| 4,669,662 | 6/1987 | Bruce | 239/163 |
| 4,714,196 | 12/1987 | McEachern et al. | 239/62 |

*Primary Examiner*—Jerry Smith
*Assistant Examiner*—Paul Gordon
*Attorney, Agent, or Firm*—Fisher, Christen & Sabol

[57] ABSTRACT

This invention relates to a process for spreading an active product in the liquid or pulverulent state over the ground in predetermined discrete zones of the surface thereof by selective programmation, the process being of the type in which the product is sprayed onto the ground via at least one boom presenting a plurality of spray nozzles, said process being characterized in that the individual flowrate of each nozzle, or group of nozzles, is monitored by appropriate control circuits, said nozzles being provided to that end with an appropriate regulating member, such monitoring being effected from a central programming unit adapted to regulate at any instant the spraying of the product at each nozzle or group of nozzles, as a function of its instantaneous position plumb with a determined discrete zone. The invention also relates to a spraying device associated with a micro-processor ensuring programmation of each nozzle.

10 Claims, 5 Drawing Sheets

PROCESS AND DEVICE FOR PROGRAMMED SPREADING OF AN ACTIVE PRODUCT ON THE SURFACE OF THE GROUND

FIELD OF THE INVENTION

The present invention relates to a process and a device for carrying out said process, for spreading an active product (in the liquid or possibly pulverulent state) over the ground.

More especially, the invention provides selectively spreading certain zones of the ground surface covered, as a function of a determined programme.

It is an object of the invention to make use of a spreading device of known type, currently used in agriculture, for spreading over the ground a product, essentially in liquid or slurry form, such spreading being programmed either instantaneously and in real time or in advance, to cover those zones, over which the appliance passes, which are selected to receive the product, whilst the other zones are not treated.

A first application of the invention is in the agricultural domain, ensuring spreading of an active product on the crops, the configuration of the land being followed very precisely.

It is another object of the invention to provide distributing active products within a parcel of land in determined, selected zones where needed, so as to ensure and limit the treatment where it is selectively necessary and to spare the zones where it would be unnecessary and even detrimental to distribute the product.

A further object of the invention provides forming on the ground surface patterns or representations for ornamental, aesthetic, decorative purposes or for advertizing or signalling, particularly to the air, and this on a large scale.

The farmer having to spread a product over a parcel of land via a mobile boom, divides the parcel into strips (following the larger length of the parcel) which are parallel to one another and preferably parallel to one of the sides. These strips are of width equal to that of the boom of the appliance. Such a hypothesis is envisaged and represented in FIG. 1.

The parcel may thus be covered and treated along strips parallel to one another and parallel to one of the sides A. Along the other sides B, C, D, marginal strips b, c, d will be provided.

As shown in FIG. 1, the inner edges of the marginal strips treated last form a staircase.

In the case shown in FIG. 1, where all the nozzles are subjected to one control, the parallel strips 1, 2, 3 begin and end in one stroke.

FIG. 2 illustrates the boundary line between the terminal edge of the parallel strips 6 and 7 and the marginal strip b in the case of sections of the boom being able to be controlled separately, depending on whether the operator controls closure of each boom more or less early.

It is therefore difficult, with the processes and equipment known at present, to cover the surface of the ground, at the terminal edge of the parallel strips, so as to follow exactly the ideal line corresponding to the straight line 9 defining the inner edge of the marginal strip.

At best, the result inside each strip is a staircase ending which leads either to a double spreading (the steps encroach on the marginal strip) or a lack of spreading (the steps do not reach the marginal strip), or an intermediate compromise in which the steps straddle the edge of the marginal strip, consequently resulting in a lack of spreading on one half of the surface of the steps and a double spreading on the other half.

The process and device according to the invention make it possible to overcome this drawback by allowing covering of the ground surface at the end of parallel strips in any appropriate, predetermined configuration, without the operator intervening.

It is thus possible, by carrying out the process and employing the apparatus as described in the present invention, to make on the ground patterns and representations following a programmed contour and geometry, without manual intervention.

SUMMARY OF THE INVENTION

To that end, the invention relates to a process for spreading on the ground an active product, in the liquid or pulverulent state, for covering a ground surface, said process being of the type in which the product is spread over the ground via at least one boom provided with a plurality of spray nozzles and in which appropriate control circuits monitor the flowrate of the nozzles provided to that end with an appropriate regulating member, such monitoring being effected from a central programming member, the process being characterized in that (a) spraying on the ground is constantly programmed in discrete zones, each discrete zone corresponding to a surface on the ground lying plumb with a nozzle, the programmation being adapted to regulate the flowrate of each nozzle, and (b) this spreading follows on the ground patterns and representations along a programmed contour and geometry.

The invention also relates to a device for carrying out the process set forth hereinabove, of the type comprising (a) a tank of product to be spread, in the liquid or pulverulent state, (b) a plurality of spray nozzles, (c) a pump for driving the product from said tank towards said spray nozzles, (d) a plurality of closure valves, one valve for each nozzle, (e) a central control and programmation means, such as a programmable microprocessor adapted to monitor at every instant the spraying of products at each nozzle or groups of nozzles, (f) a speed counter for measuring the speed of advance of the vehicle connected to said central control means, (g) programming means comprising at least one optical reader constituted by a plurality of reading heads, one reading head for each nozzle, the reading heads being disposed in lines, (h) an image recording support tape advancing under all the reading heads aligned transversely with respect to the axis of advance, each reading head being adapted to analyze the punctual zone of the image located vertically with respect to said head in order to address to the micro-processor a signal for opening or closing the valve, thus allowing the image contained in reduction in the image support tape to be reproduced on the ground.

BRIEF DESCRIPTION OF THE DRAWINGS

The invention will be more readily understood on reading the following description given with reference to the accompanying drawings, in which.

DETAILED DESCRIPTION OF THE DRAWINGS

Figure 1:
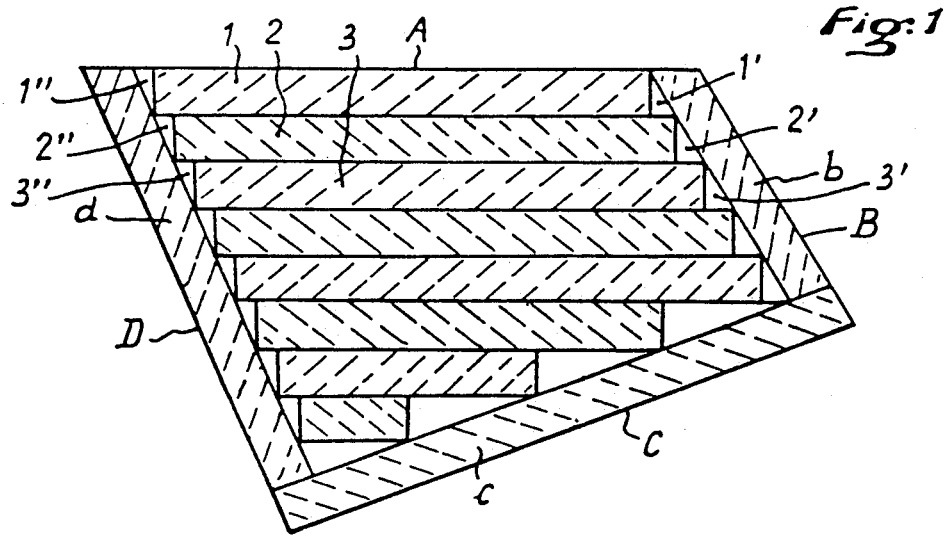
FIGS. 1 and 2, previously described, illustrate the methods of spreading on the ground in accordance with the prior art.
Figure 2:
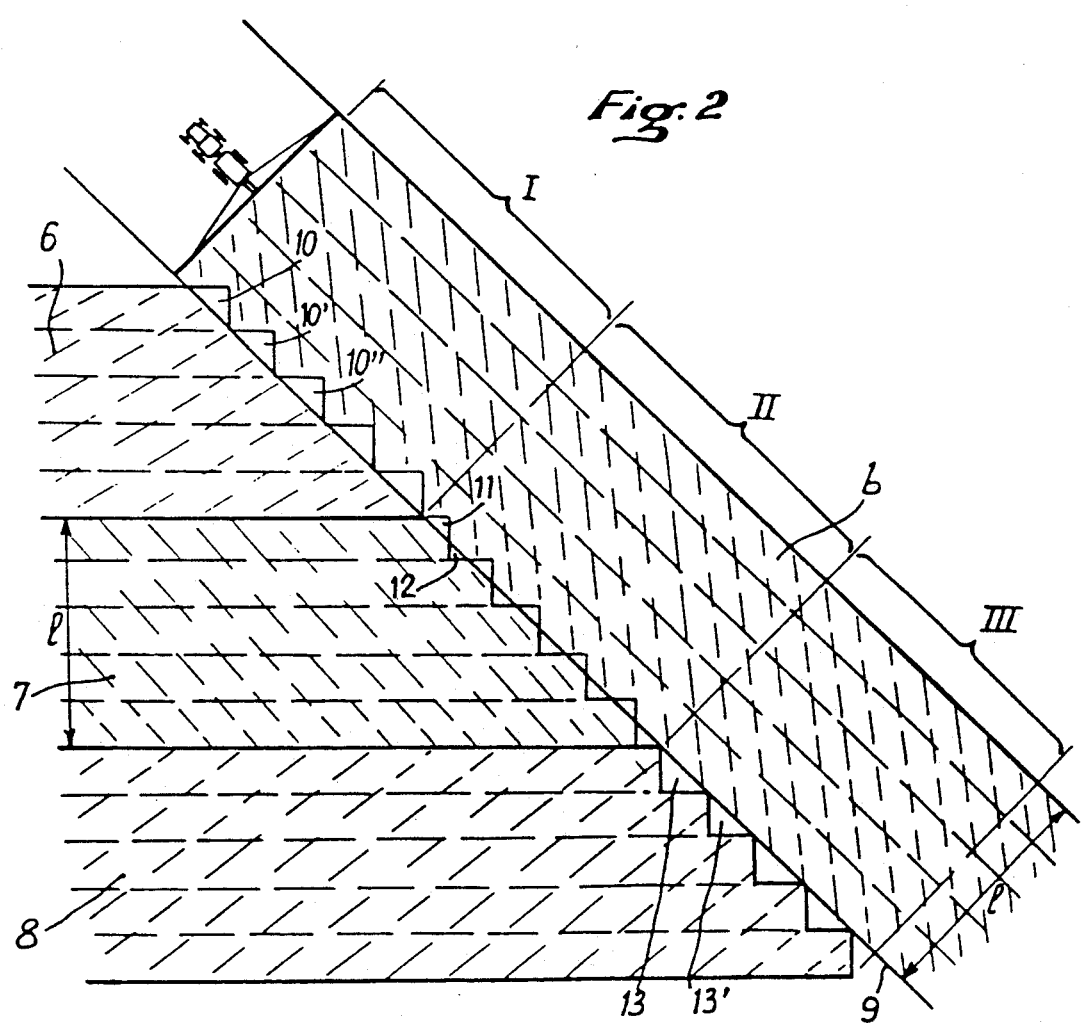
Figure 3:
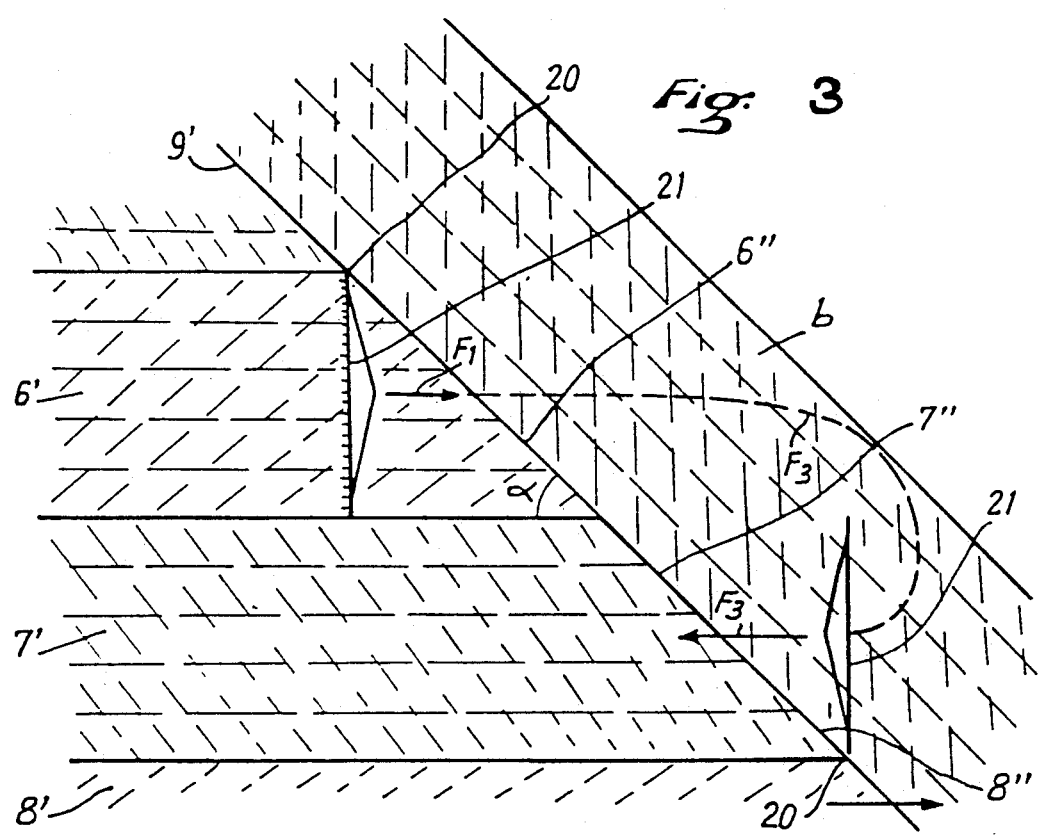
FIG. 3 shows an embodiment of the process of the invention corresponding to the surface as illustrated in FIG. 2 but having had products spread thereon in accordance with the techniques according to the present invention.

Referring again to the drawings, the application of the invention to spreading an active product for agricultural purposes is illustrated in FIG. 3.

It will immediately be seen, as opposed to the prior art techniques set forth hereinabove, that the spreading which employs the processes and equipment according to the present invention ensures a regular distribution, without duplication nor lack, eliminating the risks of human error.

In fact, FIG. 3 shows that the parallel strips 6', 7' and 8' may, in the process of the invention, begin and end in a bevelled transverse section of angle $\alpha$ corresponding precisely to the angle formed between the axes of the parallel strips and the marginal strip b.

The spreading machine terminating strip 6' and advancing in the direction of arrow F1 reaches line 9' which corresponds to the ideal inner terminal edge of the marginal strip b.

When the end of the spreading boom assembly 21 reaches line 9', the operator sends a signal to the programming micro-processor in accordance with the invention.

This micro-processor has previously received the display of the data corresponding to the configuration of the land, particularly the angle $\alpha$ which is integrated in the data of the program; as a function of this angle $\alpha$, and of the speed of advance of the vehicle (which is easily communicated to the micro-processor from a probe located on a wheel, as known per se), said micro-processor is then adapted progressively to generate signals for closure which will reach each of the nozzles constituting the boom 21, exactly at the moment when the nozzle reaches line 9, with the result that the strip 6' ends in a bevel of angle $\alpha$.

In accordance with a development of the invention and in the case of more complex parcels, it is possible, after having analyzed, according to plan, the profile of the parcel and the parallel strips therein, to display a program memorized on any suitable support, particularly magnetic or optical, and integrated in the micro-processor which, as a function of each passage, knows, from the signal triggered off by the operator, the cycle of closure or of opening of the individual nozzles intended to shape on the land the end of the strip so that it follows the contour and shape of the inner edge of the marginal strip corresponding to the terminal passage of the machine.

To that end, according to a development of the present invention, the boom assembly comprising the spray nozzles is doubled by optical analysis means preferably located upstream in the direction of advance of the machine, and these optical analysis means comprise image taking means in a number equal to that of the booms, and each image taking means, for example an optical condenser, is connected by transmission means, for example an optical wave guide, to a central image analysis unit adapted to detect the optical characteristics of the discrete zone located plumb with the optical condenser, and these optical analysis means are adapted to transmit to the programming micro-processor a signal for actuating or closing the spray nozzles as a function of the analysis detected previously.

Figure 7:
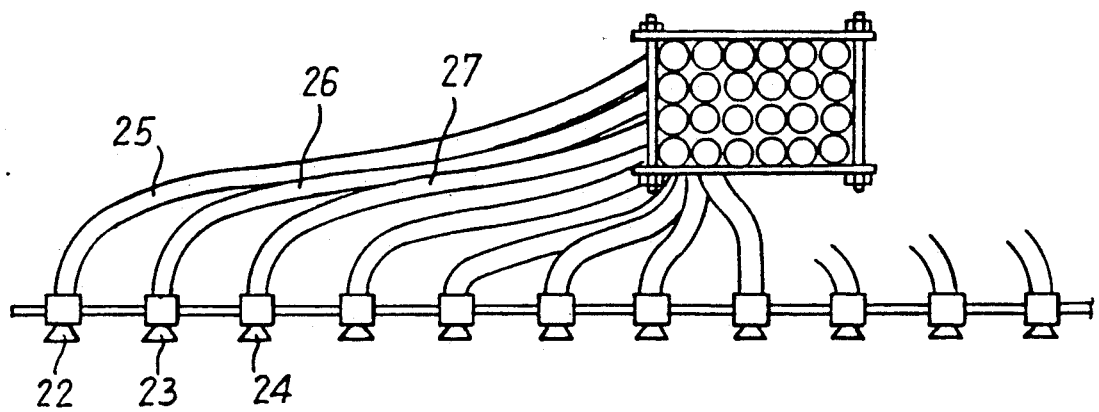
FIGS. 7 and 8 show devices for optical recognition of the ground, associated with the device of the invention.
Figure 8:
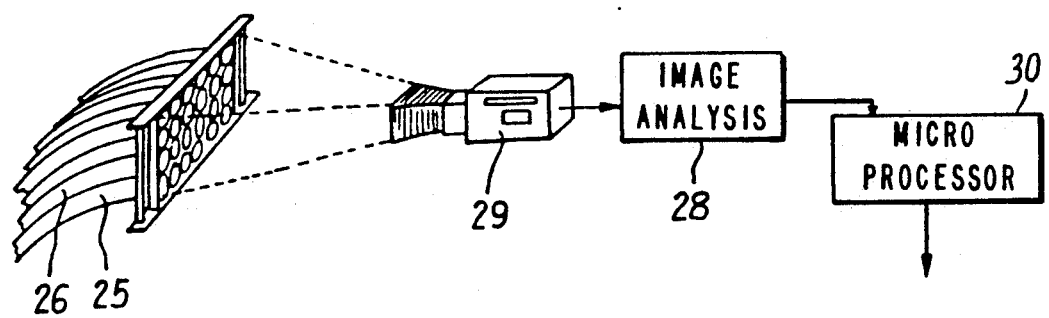

FIGS. 7 and 8 show that, parallel to the spray booms (not shown in order to render the drawing more comprehensible), there are disposed one or more optical detection booms comprising a plurality of optical detectors referenced 22, 23, 24 connected by wave guides 25, 26, 27 to a central image analysis device 28 comprising a camera 29 and adapted to address to the programming micro-processor 30 signals triggered off by the detection of chromatic variations and actuating that or those spray nozzles corresponding to the optical detectors where the variations were noted.

An automatic correction device may be incorporated in the system in order to take into account the sunshine and consequently the instantaneous lighting of the punctual zone subjected to detection.

Figure 4:
FIG. 4 shows a message or image intended to be reproduced on the ground in large dimensions.
Figure 5:
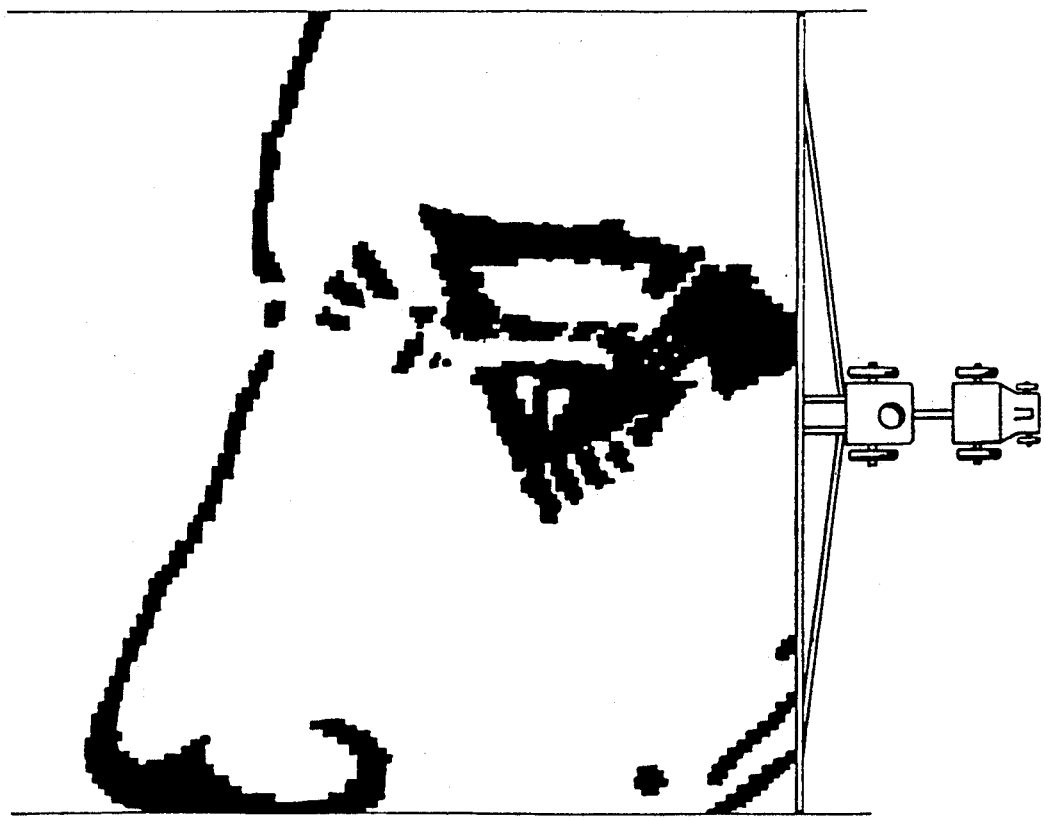
FIG. 5 represents the formation of this image by a spreading device employing the techniques of the invention.

An application of the invention is illustrated in FIGS. 4 and 5.

The overall representation of FIG. 4 is ideally divided into parallel, longitudinal strips 31, 32, 33 and 34, each strip corresponding to a passage of the spreading machine.

The spreading machine may be loaded with colorant products in one color, but it will also be possible, according to the process and device of the invention, to make representations in several colors.

The spreading machine may also be loaded with various plant-protective products (particularly weedkillers) so as to act on the vegetation and punctually to alter the appearance thereof.

Each strip 31, 32, 33, 34 representing a passage of the machine corresponds to a program.

Each strip 31 will itself be divided longitudinally into sub-strips corresponding to the position of a spray nozzle on the boom.

It is easy, either from an optical reading device or possibly by manual acquisition, to read successively each of the strips 31, 32, 33 and 34 so as to set up a program on a data-processing or optical support such that spraying of the colored product will be triggered off in situ when the corresponding nozzle is located at the level of a discrete zone on the ground on which the product is to be applied so as to ensure the desired representation overall.

According to a simple embodiment, the program may be simply traced on successive strips 31, 32, 33 and 34 and supplying an optical reader comprising, in lines, as many reading heads as spray nozzles.

The optical reader is supplied at each passage over the strips 31, 32, etc. . . successively and when the reader corresponding to a nozzle detects the presence of a colored discrete zone on the program support, it automatically triggers off spraying of a product on the ground until the arrival of a white zone interrupts such spraying.

FIG. 5 illustrates the projection on the land, and under real conditions, of the program as enclosed in broken lines in FIG. 4 and it will be readily understood that it is possible, in this embodiment, to make polychromatic compositions from several passages, each passage corresponding to the spraying of a color and being supplied from a program specific to this color.

Figure 6:
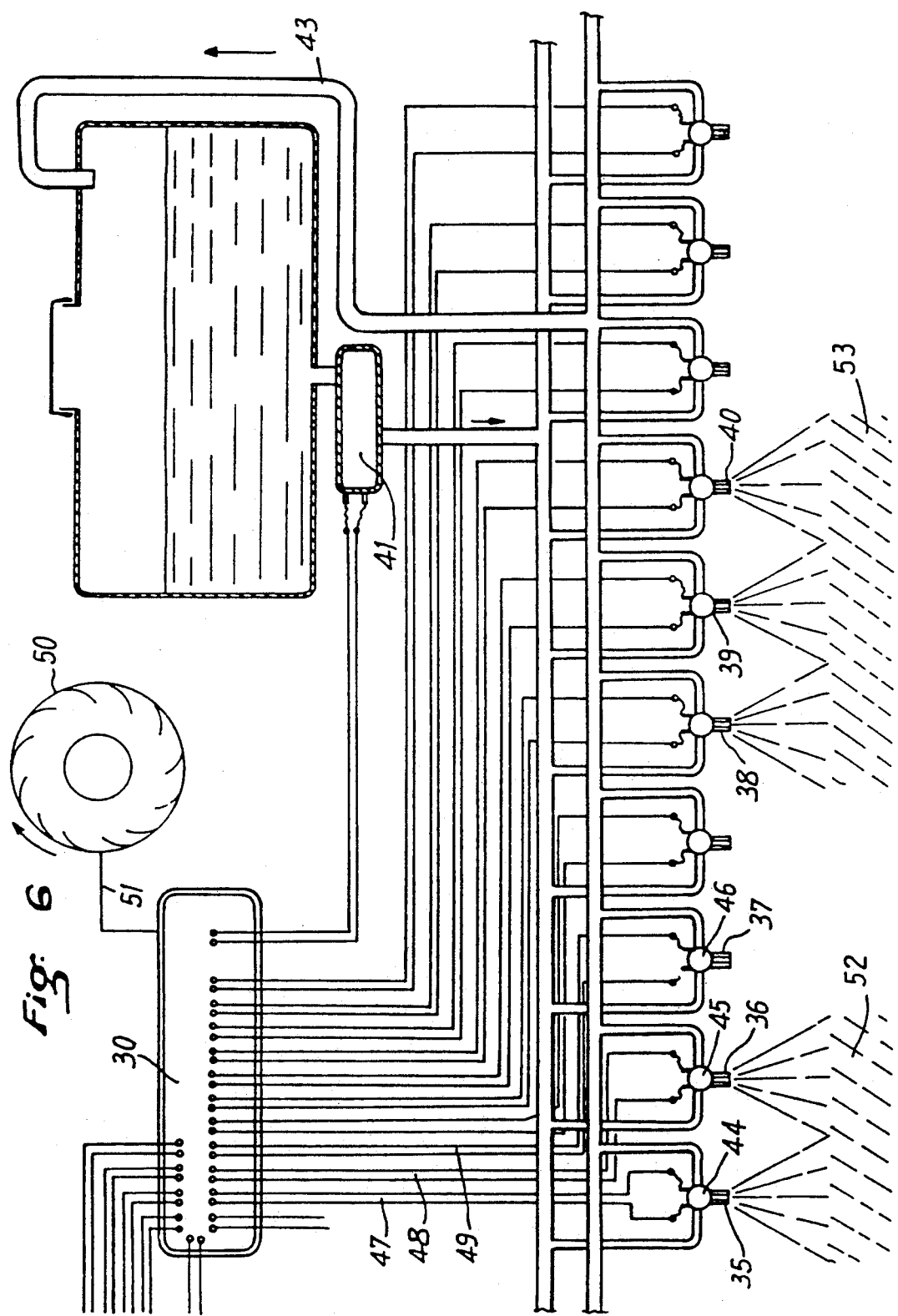
FIG. 6 schematically shows the device and the machine for programmed distribution according to the invention.

FIG. 6 illustrates an embodiment of the device according to the invention, shown partially.

As is known, the spray devices may comprise up to more than 60 nozzles; in order to simplify FIG. 6, the number has been limited to 10, it being understood that the machine will comprise a number of nozzles corresponding to the technical possibilities.

Each of the spray nozzles 35, 36, 37, 38, 39, 40, etc. . . are supplied from tank 42 via pump 41.

A return circuit 43 allows return of the product not sprayed as a function of the flowrate of the pumps.

Each pump is subjected to the action of a control member (opening, closure) adapted to regulate its flowrate either by all or nothing or possibly by calibrated proportioning.

This regulating member 44, 45, 46, constituted for example by an electro-valve, is itself controlled by an independent circuit 47, 48, 49 coming from the central programming micro-processor 30.

Furthermore, this micro-processor receives information on the speed of advance of the vehicle, picked up on wheel 50 and routed via circuit 51.

The micro-processor contains memories, and in particular programmable memories, which make it possible to control, as a function of said program, the cycle of opening and/or of closure of the nozzles 35, 36, etc. . .

In the embodiment of FIG. 6, nozzles 35, 36, on the one hand, 38, 39 and 40, on the other hand, are in open position, with the result that the active products are thus sprayed onto the ground along the two strips 52, 53.

What is claimed is:

1. A process for spreading a liquid or pulverulent active product on the ground for covering a ground surface in a predetermined contour and geometry, wherein said product is spread over the ground via a device having at least one boom provided with a plurality of spray nozzles each provided with an independent opening/closing regulation member and in which control circuits selectively monitor the opening and closing of each of the nozzles, and thus the flowrate of the product, said device including a central microprocessor to selectively control each of said regulation members and connected said control circuits to monitor the opening and closing of the regulation member, wherein said process comprises;
    (a) spraying said product on the ground in constantly programmed discrete zones, each discrete zone corresponding to a surface on the ground lying plumb with a nozzle, the microprocessor controlling opening and closing of said independent regulation member of each nozzle and to regulate the flowrate of said product delivered by each nozzle whereby spreading of the product follows on the ground patterns and representations along said programmed contour and geometry;
    (b) adjusting and controlling of each opening/closing regulation member for each nozzle by said microprocessor from a program coded on a magnetic or optical support to dispense said product in said patterns and representation;
    (c) said program of the microprocessor being displayed at the start of the spreading process by the user from data corresponding to the configuration of the zones treated and integrated in the microprocessor.

2. The process of claim 1, wherein a plurality of successive passes of said spray booms are effected on said ground surface, each pass corresponding to the spreading of specific product and being effected on predetermined programmed discrete zones below each nozzle specific to each product, with the result that the different products, as a function of the programs of each pass, totally or partially cover one another on each zone or are exclusive from one another.

3. The process of claim 2, wherein the programs for successive opening or closure of the nozzles are contained in a removable magnetic or optical support means corresponding to a configuration of a surface to be treated, and the program is divided into a plurality of successive sequences, each sequence corresponding to a pass serving a determined part of the surface to be treated, and a starting signal is sent to the microprocessor to trigger off the sequence of the program corresponding to the beginning of each new pass.

4. The process of claim 3, wherein the microprocessor is coupled with an image signal reader and said reader is supplied with image signal sources divided into strips, each sequence of said program corresponding to a discrete zone of the surface to be treated, and each strip is advanced in order to be analyzed by the signal reader along a line of reading transverse to the advance of the signal reader and the reader is provided with a number of reading heads distributed along said line in a number identical to the number of nozzles controlled independently, and the reader, as a function of punctual coloring of the discrete zones to be treated along the line of reading, determines a desirable position between the opening and closure of each nozzle corresponding to each reading head and to send a signal integrated in the micro-processor, controlling the opening or closure of a corresponding nozzle and spraying said active product on the discrete zone on the ground served by said nozzle.

5. The process of claim 1, wherein the active product sprayed is provided to act on the development of the vegetation.

6. The process of claim 1, wherein the active product sprayed has a direct action of coloring the ground.

7. A device for carrying out the process of claim 1, comprising:
    (a) a tank for liquid or pulverulent products to be spread,
    (b) a plurality of spray nozzles,
    (c) a pump for delivering the product from said tank to said spray nozzles,
    (d) a plurality of closure valves, one valve for each nozzle,
    (e) a central control and programming means, comprising a programmable microprocessor to monitor at every instant the spraying of products at each nozzle,
    (f) a speed counter for measuring the speed of advance of a vehicle connected to said central control means,
    (g) programming means comprising at least one image signal reader constituted by a plurality of reading heads, one reading head for each nozzle, the reading heads being disposed in lines,
    (h) an image recording support tape advancing under all the reading heads aligned transversely with respect to the axis of advance, each reading head being capable of analyzing a punctual zone of an image located vertically with respect to said head to address to the microprocessor a signal for opening or closing the valve, thus allowing an image in the image support tape to be reproduced on the ground.

8. A device for carrying out the process of claim 1 comprising:
   (a) a tank for liquid or pulverulent products to be spread,
   (b) a plurality of spray nozzles,
   (c) a pump for delivering the product from said tank to said spray nozzles,
   (d) a plurality of closure valves, one valve for each nozzle,
   (e) a central control and programming means comprising a programmable microprocessor to monitor at every instant the spraying of products at each nozzle,
   (f) a speed counter for measuring the speed of advance of a vehicle connected to said central control means;
   (g) booms bearing the nozzles,
   (h) optical analysis means disposed on said booms to determine the characteristics of the ground or the vegetation located plumb with said analysis means, and means to send signals generated in response to said characteristics to the programmable microprocessor in order to control opening or closure of the nozzles and the spraying of products on the ground at a level of each nozzle located plumb with a discrete zone instantaneously analyzed by said optical analysis means.

9. The process of claim 1, wherein an optical analysis means, is effected at each instant, of the nature of the discrete zone subjected to a potential action of each nozzle by analyzing the coloring of the vegetation, and generating a signal in response to the analyzing of the coloring and sending said signal to said programming microprocessor of a determined open or closed position of each nozzle which is thus actuated as a function of the optical analysis made on the ground.

10. A device for spreading a liquid or pulverulent product in a predetermined contour and geometry on a ground surface as said device is moved across the ground surface, said device comprising;
   (a) a supply tank for liquid or pulverulent products to be spread;
   (b) a plurality of downwardly directed spray nozzles disposed in a line, each of said nozzles having a closure valve;
   (c) central control and programming means comprising a programmable microprocessor to monitor and selectively control spraying of said product through each nozzle;
   (d) speed counter means connected to said microprocessor for measuring ground speed of said device across the ground;
   (e) programming means associated with said microprocessor and comprising a plurality of image signal reading heads, each of said heads complementing one of said nozzles, and wherein said heads are disposed in a line substantially parallel with said spray nozzles;
   (f) an image recording support disposed on the ground whereby each of said reading heads advancing across the ground reads said image whereby said microprocessor selectively actuates said nozzles to spray said product in a pattern in response to said image recording support.

* * * * *